Feb. 27. 1934.        J. M. LARSON        1,949,210
TWO-LEVEL TEMPERATURE THERMOSTAT
Filed May 25, 1931        3 Sheets-Sheet 3
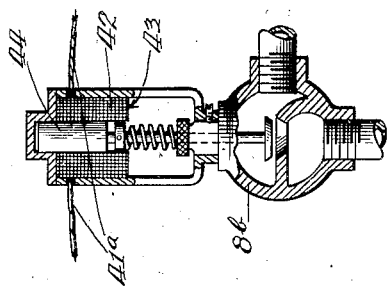
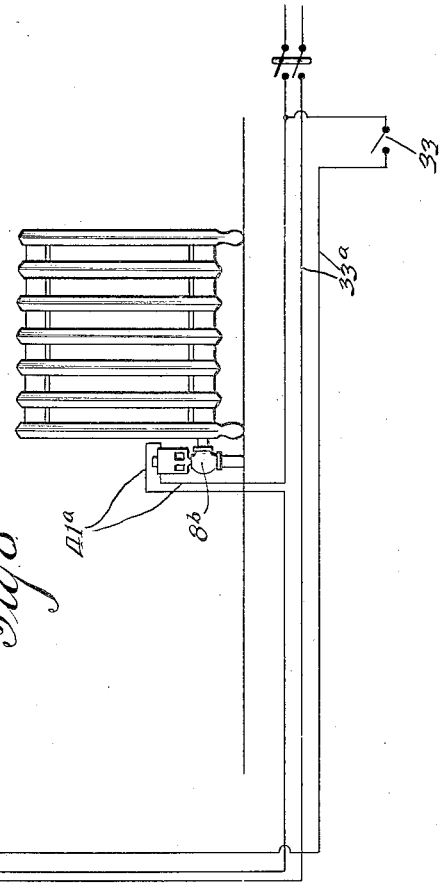
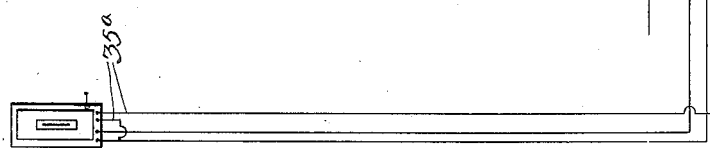
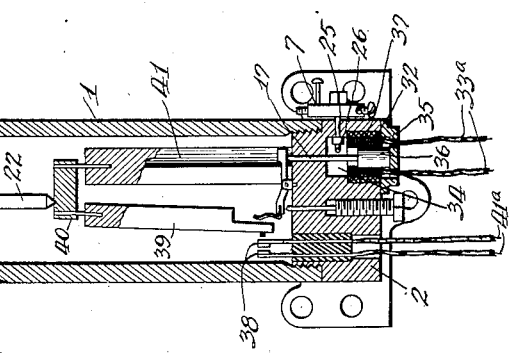
Inventor
John M. Larson
By Jones Addington Ames & Seibold
Attys Patented Feb. 27, 1934

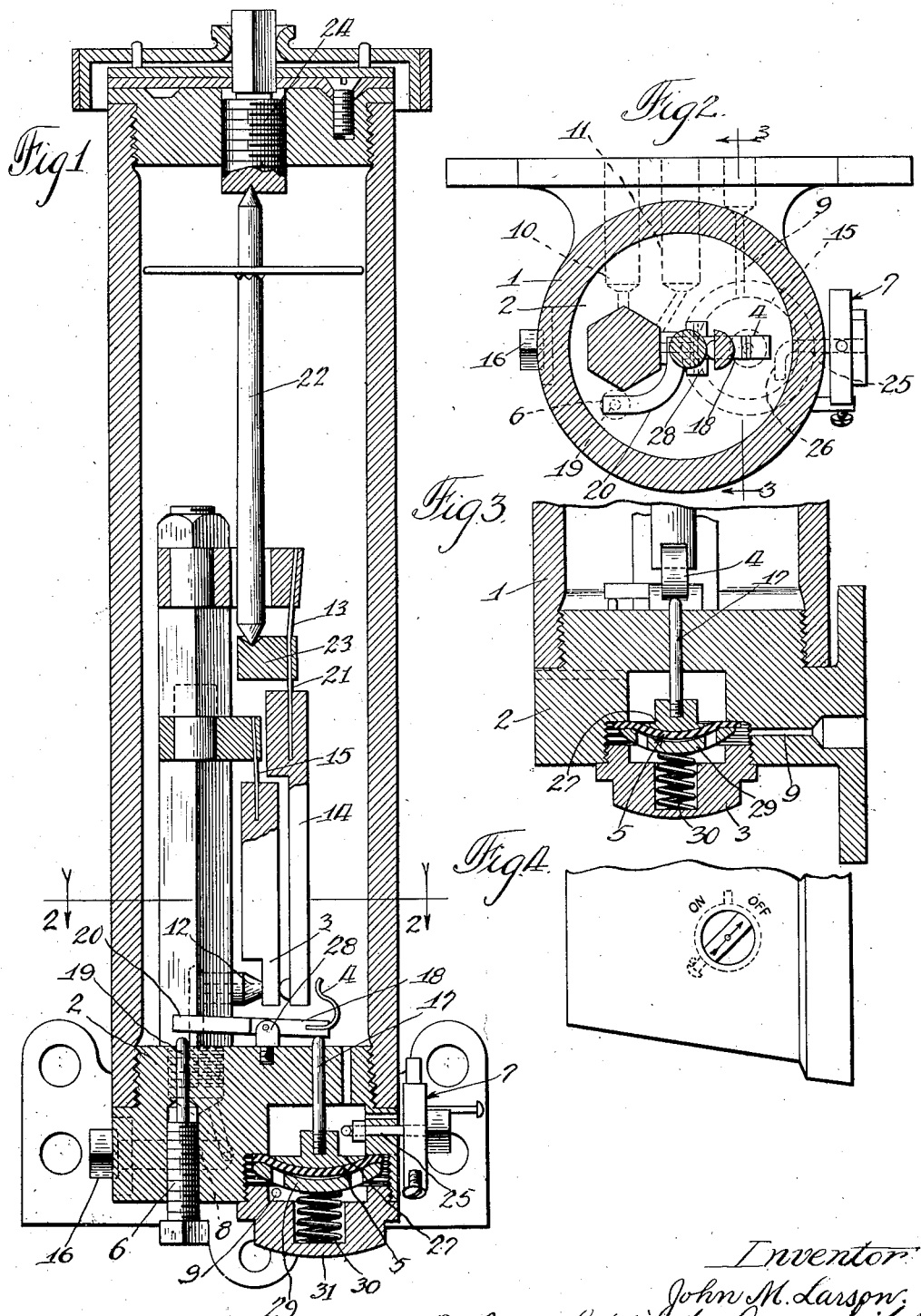

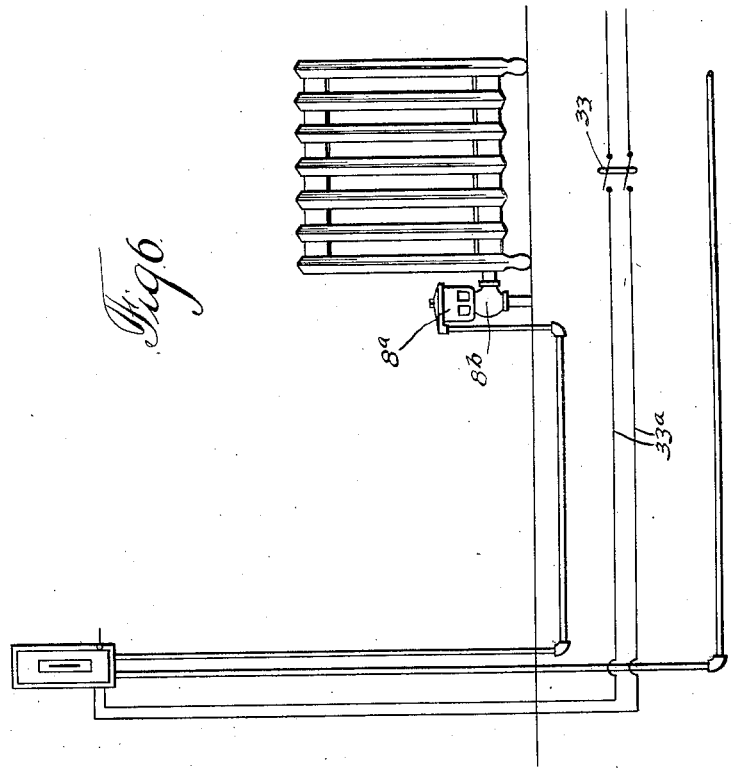
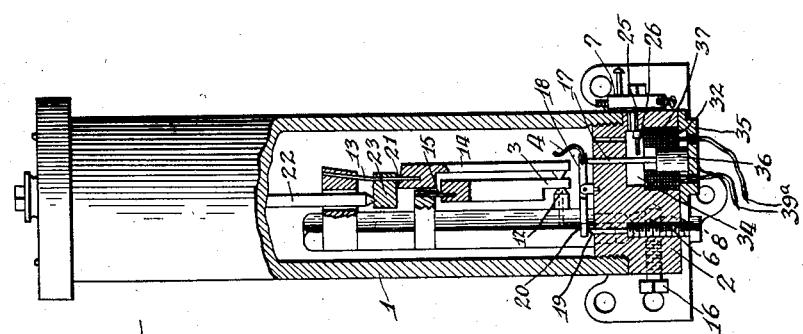

1,949,210

UNITED STATES PATENT OFFICE 1,949,210

TWO-LEVEL TEMPERATURE THERMOSTAT

John M. Larson, Chicago, Ill., assignor to National Regulator Company, Chicago, Ill., a corporation of Illinois Application May 25, 1931. Serial No. 539,769

19 Claims. (Cl. 236—87)

My invention relates to a two-level temperature thermostat construction.

One of the objects of my invention is to provide an improved two-level temperature thermostat construction in which the control is effected by means of a single valve and a single thermostatic element.

A further object is to provide such a construction in which parts which would be likely to get out of adjustment if placed in exposed positions are properly housed and protected.

A further object is to provide such a construction in which the main controlling parts are all mounted on a plug for the end of the extensible tube.

A further object is to provide such a construction which will be durable and efficient in use.

Further objects will appear from the description and claims.

In the drawings, in which several embodiments of my invention are shown,

Figure 1 is an axial section of a thermostat embodying my invention;

Fig. 2 is a section on the line 2—2 of Fig. 1;

Fig. 3 is a section on the line 3—3 of Fig. 2;

Fig. 4 is a view from the right of the lower end of Fig. 1;

Fig. 5 is a view similar to Fig. 1 but showing the electric control for the temperature level;

Fig. 6 is a diagrammatic view showing the radiator valve controlled by the thermostat of Fig. 5;

Fig. 7 is a view similar to Fig. 5 but showing the electric control for the radiator valve and electric control for the temperature level;

Fig. 8 is a diagrammatic view showing a radiator valve controlled by the thermostat of Fig. 7; and Fig. 9 is a detail view showing the radiator valve and electric actuator of Fig. 8.

In Figs. 1 to 4 inclusive of the drawings is shown a two-level temperature thermostat construction comprising a heat extensible tube 1, a screw plug 2 closing the end of said tube, a temperature-controlling valve 3 in said tube, carried by said plug and controlled by the expansion and contraction of said tube, transmission from said tube to said valve, spring means 4 in said tube carried by said plug for modifying the action of the valve 3 to change the temperature level, pneumatic means 5 carried by said plug for shifting said spring 4 from nonmodifying to modifying position, an adjustable screw 6 carried by said plug for adjustably limiting the movement of the spring 4 under the action of said pneumatic means, manually operable means 7 carried by said plug for rendering said pneumatic means ineffective when desired, a restricted air passage in said plug leading from a source of compressed air to a pneumatic motor 8ª for a radiator valve 8ᵇ (Fig. 6), vented by said temperature-controlling valve 3, and an air passage 9 in said plug leading to the pneumatic spring shifting means 5.

Before describing in greater detail certain features of the construction, I will briefly outline the operation.

The air passage 10 (Fig. 2) is connected with a suitable source of compressed air, the passage 11 is connected with a pressure-closed radiator valve, and the passage 9 is connected with a manually-controllable source of compressed air which can be turned on or off as desired to change the temperature level. Assuming that it is desired to maintain the high level day-time temperature, the valve modifying spring 4 will be in the position shown in Fig. 1.

Assuming that the pressure-closed radiator valve has been open for a time and has raised the room temperature up to or slightly above the desired day-time temperature level, the heat extensible tube 1 will have expanded allowing the vent-controlling valve 3 to close the vent port 12 under the action of the leaf spring fulcrum 13 supporting the valve actuator lever 14, the tension of the spring 13 acting to close the valve 3. This will cause pressure to be built up in the pneumatic device which operates the radiator valve and will cause this radiator valve to close, cutting off the heat. This will cause the room temperature to lower, causing the heat extensible tube 1 to contract to move the spring mounted valve-controlling lever 14 to the right to release its pressure on the valve 3, permitting the valve 3 to open the vent port 12 under the action of the spring fulcrum 15 on which the valve is mounted, the tension in the spring 15 tending to open the valve 3. This will vent the air from the pneumatic power device which controls the radiator valve faster than it can be supplied from the passage 8 past the flow-reducing screw 16 which is adjusted to permit just the correct amount of flow for proper operation. The venting of the pneumatic power device which closes the radiator valve permits the radiator valve to open under the action of a suitable spring, thus causing the radiators to heat up again to raise the room temperature. This cycle of operation is repeated to maintain the room temperature substantially at the desired day-time level.

In order to put into effect the desired subnormal or night-time temperature, the operator supplies compressed air through the passage 9 underneath the diaphragm 5 which raises the plunger 17 and rocks the lever 18 on which the temperature-modifying spring 4 is mounted to bring the upper end of the temperature-modifying leaf spring 4 into engagement with the lower end of the spring-mounted lever 14 which controls the vent-controlling valve 3. The distance to which this rock lever is moved by the action of the plunger is determined by the adjustable screw 6 threaded into the plug 2 and having a reduced extension 19 in position to be engaged by the extension 20 of the rock lever on which the spring is mounted. By adjusting this screw 6, the amount of spring pressure which the temperature-modifying spring exerts may be determined to an exact degree.

When this spring 4 is thus moved to temperature-modifying position, it holds the spring mounted valve-controlling lever 14 against the vent-controlling valve 3, holding the vent-controlling valve against the vent port 12 until the heat extensible tube 1 contracts to an extent sufficient to overcome the resistance of this temperature-modifying spring 4, which necessitates a flexing of the leaf spring mounting at the point 21 to an extent sufficient to set up a tension in this leaf spring which will overcome the resistance of the temperature-modifying spring 4. This means that the heat-extensible tube will have to contract to a greater extent to permit the vent-controlling valve 3 to open when the temperature-modifying spring 4 is in modifying position than is the case when the temperature-controlling spring 4 is not in temperature-modifying position. Under these conditions, therefore, the action of the thermostat will include the same cycle of operations as previously outlined in connection with the maintenance of normal day-time temperature but with the exception that the temperature level maintained will be lower because of the greater degree of contraction of the tube necessary for the opening of the vent valve.

The transmission from the tube 1 to the actuator 14 comprises a push rod 22, the lower end of which bears on a block 23 secured to the spring 13, and forming a lever arm for the valve actuator 14. The upper end of the push rod is engaged by the adjusting screw 24 which determines the normal day-time temperature level.

It is common practice to provide a plurality of these thermostats in the various rooms of a building and have the temperature-modifying springs 4 all controlled collectively by means of branch conduits leading from a central manually-controllable pressure control valve. In such an installation it may be desirable to maintain a normal day-time temperature in one of the rooms at a time when the majority of the rooms are to be maintained at the low-level night temperature. For this purpose a manually-operable rock shaft 25 is provided having a laterally-extending arm 26 which can be turned down so as to bear against and force downwardly the button 27 which rests on the pressure-operated diaphragm 5, thus forcing the plunger downwardly and permitting the spring 4 to drop to a position in which it does not engage the valve-controlling lever 14 and permitting the thermostat to operate on the normal temperature basis. The pressure between the end of the arm 26 and the button 27, (due to the fact that there is pressure underneath the diaphragm 5) is sufficient to hold the arm in its downwardly-extending position against the action of a suitable counterweight or spring tending to raise the arm to horizontal position. As soon, however, as the central control is operated to relieve the pressure underneath the diaphragm 5, the pressure between the button 27 and the end of the arm 26 will be relieved, permitting the arm to be returned to horizontal position under the action of the aforesaid spring or counterweight. This return of the arm to horizontal position will restore the thermostat in question to the central control so that thereafter it can be controlled with the other thermostats collectively.

It will be noted that the principal working parts of the thermostat are mounted on the plug 2 which is screwed into the end of the heat-extensible tube 1. This makes a self-contained assembly so that the operating parts stay in adjustment and are protected from injury by being housed in the heat-extensible tube.

The provision of the valve-operating lever 14 between the spring 4 and valve 3 enables a bearing pressure to be exerted on the valve which is directly in line with the vent port 12, thus causing the valve to seat evenly under all conditions, regardless of the adjustment which may be made for the temperature-modifying spring 4.

The lever 18 on which the temperature-modifying spring 4 is mounted may be pivoted in a suitable bearing bracket 28 screwed into the plug 2. The diaphragm which operates the plunger button may be held in position by means of an apertured retaining disc 29, the edge of which is forced against the edge of the diaphragm by means of a coil compression spring 30 seated in a pocket in the screw cap 31.

It will be seen that the device described may be used to maintain selectively two different temperature levels by means of a single vent-controlling valve 3 and a single thermostatic element 1; that the principal moving and working parts are completely housed and protected against injury; that the adjustments for the two temperature levels may be effected from the outside of the housing, and that the low level temperature adjustment may be made without actually necessitating that the room temperature shall drop to the minimum temperature which it is desired to maintain.

This adjustment is accomplished as follows: It will be assumed that the normal temperature level is to be 70 degrees and the low or night temperature level, 40 degrees. This means that the normal level is 30 degrees above the low temperature level. To secure the desired low level temperature adjustment while the room temperature is still at approximately 70 degrees, the adjusting screw 24 for the normal level temperature adjustment is turned up to a setting of 30 degrees above the normal temperature setting, that is, to a setting of 100 degrees. Pressure is then supplied underneath the diaphragm 5 to throw the spring 4 into effective position. The low level temperature adjusting screw 6 is then turned until air just barely escapes through the vent port 12. This point of adjustment will be made known by the slight noise of the escaping air. The pressure is then released underneath the diaphragm 5, allowing the spring 4 to move to non-modifying position, and the normal temperature adjusting screw 24 is turned back to the normal setting of 70 degrees. The parts are now in position to maintain normal daytime temperature, when there is no pressure underneath the diaphragm 5, and to maintain a temperature of 30 degrees below normal (that is a 40 degree temperature), when pressure is supplied underneath the diaphragm 5 and the spring 4 is moved to temperature-modifying position.

The construction shown in Figs. 5 and 6 is substantially the same as that shown in Figs. 1 to 4 inclusive, except that here the spring means 4 which control the temperature level are controlled by a solenoid 32 and switch 33 controlling the circuit 33a of the solenoid. The solenoid 32 is mounted in a suitable recess 34 in the plug 2 and held therein by a cap 35 secured to the plug. The core or plunger 36 of the solenoid 32 actuates the push rod 17 in the same manner as the pneumatic means 5 shown in Fig. 1. The upper surface of the solenoid coacts with the laterally-extending arm 26 in the same manner as does the upper surface of the button 27 of Fig. 1. When the switch 33 is closed, the coil 37 of the solenoid 32 is energized and the plunger 36 rises, making the leaf spring 4 effective to change the temperature level.

The construction of Figs. 7, 8 and 9 is substantially the same as that of Figs. 5 and 6, except that here electrical means are provided for operating the radiator valve controlled by a pair of spring contacts 38 in the heat-extensible tube 1. These spring contacts 38 are controlled by means of a lever 39 mounted on a spring fulcrum member 40 which is in turn mounted on the post 41 carried by the plug 2. The position of this lever is controlled by the expansion and contraction of the tube 1 through the action of the push rod 22. When the tube 1 expands with the heat, it permits the lower end of the spring-mounted lever 39 to move to the left, as seen in Fig. 7, under the tension of the spring fulcrum 40, closing the circuit between the two spring contacts 38. This completes the circuit 41a for the coil 42 of the solenoid 43 which controls the radiator valve 8b, causing the plunger or core 44 of the solenoid to be moved downwardly to close the radiator valve, thus closing off the heat.

The change of temperature level is effected just as in the construction of Figs. 5 and 6 by closing the switch 33 which controls the circuit 33a for the temperature level solenoid 32.

The location of the contacts inside the heat extensible tube 1 has a special advantage in that the contacts are protected from dust and foreign substances which would interfere with their proper electrical function.

Further modifications of this invention will be apparent to those skilled in the art and it is desired, therefore, that my invention be limited only by the showing of the prior art and the scope of the appended claims. What I claim as new is:

1. In a temperature control system, a two-level temperature thermostat construction comprising a heat-expansible tube, a temperature-controlled valve in said tube controlled by the expansion and contraction of said tube, a plug for the end of said tube, yielding resistance means for modifying the action of the valve to change the temperature level, and a member movably mounted on said plug, said yielding resistance means being mounted on said movable member and movable therewith into and out of temperature-modifying position.

2. In a temperature control system, a two-level temperature thermostat construction comprising a heat-expansible tube, a temperature controlled valve in said tube controlled by the expansion and contraction of said tube, a plug for the end of said tube, yielding resistance means mounted on said plug for modifying the action of the valve to change the temperature level, and pneumatic means for controlling the action of said yielding resistance means.

3. In a temperature control system, a two-level temperature thermostat construction comprising a heat-expansible tube, a temperature-controlled valve in said tube controlled by the expansion and contraction of said tube, a plug for the end of said tube, yielding resistance means mounted on said plug for modifying the action of the valve to change the temperature level, and pneumatic means mounted on said plug for controlling the action of said yielding resistance means.

4. In a temperature control system, a two-level temperature thermostat construction comprising a heat-expansible tube, a temperature controlled valve in said tube controlled by the expansion and contraction of said tube, a plug for the end of said tube, movable yielding resistance means mounted on said plug for modifying the action of the valve to change the temperature level, and pneumatic means for moving said yielding resistance means.

5. In a temperature control system, a two-level temperature thermostat construction comprising a heat-expansible tube, a temperature-controlled valve in said tube controlled by the expansion and contraction of said tube, a plug for the end of said tube, movable yielding resistance means mounted on said plug for modifying the action of the valve to change the temperature level, and pneumatic means mounted on said plug for moving said yielding resistance means.

6. In a temperature control system, a two-level temperature thermostat construction comprising a heat-expansible tube, a screw plug closing the end of said tube, a temperature-controlled valve in said tube, carried by said plug and controlled by the expansion and contraction of said tube, transmission from said tube to said valve, yielding resistance means in said tube carried by said plug for modifying the action of the valve to change the temperature level, pneumatic means carried by said plug for shifting said yielding resistance means from non-modifying to modifying position, adjustable means carried by said plug for adjustably limiting the movement of the yielding resistance means under the action of said pneumatic means, manually operable means carried by said plug for rendering said pneumatic means ineffective when desired, a restricted air passage in said plug leading from a source of compressed air to a pneumatic motor for a radiator valve, and vented by said temperature controlled valve, and an air passage in said plug leading to the pneumatic shifting means.

7. In a temperature control system, a two-level temperature thermostat construction comprising a heat-expansible chamber, a temperature-controlled valve in said chamber controlled by the expansion and contraction of said chamber, yielding resistance means for modifying the action of the valve to change the temperature level, pneumatic means for controlling the action of said yielding resistance means, and manually controllable means for selectively counteracting the effect of the pneumatic means.

8. In a temperature control system, a two-level temperature thermostat construction comprising a heat-expansible chamber, a temperature-controlled valve in said chamber controlled by the expansion and contraction of said chamber, yielding resistance means for modifying the action of the valve to change the temperature level, pneumatic means for controlling the action of said yielding resistance means, manually controllable means for selectively counteracting the effect of the pneumatic means, and means whereby the pneumatic means may be controlled for resetting the manual counteracting means.

9. In a temperature control system, a two-level temperature thermostat construction comprising a heat-expansible chamber, a temperature-controlled valve in said chamber controlled by the expansion and contraction of said chamber, yielding resistance means for modifying the action of the valve to change the temperature level, and electric means for controlling the action of said yielding resistance means.

10. In a temperature control system, a two-level temperature thermostat construction comprising a heat-expansible chamber, a temperature-controlled controlling device in said chamber controlled by the expansion and contraction of said chamber, yielding resistance means for modifying the action of the controlling device to change the temperature level, and electric means for controlling the action of said yielding resistance means.

11. In a temperature control system, a two-level temperature thermostat construction comprising a temperature-controlled controlling device, movable yielding resistance means for modifying the action of the controlling device to change the temperature level, and electric actuating means for moving said yielding resistance means.

12. In a temperature control system, a two-level temperature thermostat construction comprising a temperature-controlled electrical controlling device, movable yielding resistance means for modifying the action of the controlling device to change the temperature level, and electric actuating means for moving said yielding resistance means.

13. In a temperature control system, a two-level temperature thermostat construction comprising a heat-expansible tube, a temperature-controlled valve in said tube controlled by the expansion and contraction of said tube, a plug for the end of said tube, yielding resistance means mounted on said plug for modifying the action of the valve to change the temperature level, and electric means mounted on said plug for controlling the action of said yielding resistance means.

14. In a temperature control system, a two-level temperature thermostat construction comprising a heat-expansible chamber, circuit controlling means in said chamber controlled by the expansion and contraction of the chamber, remote control means for modifying the action of said circuit controlling means to change the temperature level, and manually operable means for nullifying the effect of the remote control means.

15. In a temperature control system, a two-level temperature thermostat construction comprising a heat-expansible chamber, a temperature-controlled flow controller in said chamber controlled by the expansion and contraction of said chamber, and means for changing the temperature level control from one definite level to another definite level comprising a spring movable to one definitely-located position in which it exerts a definite spring action on said flow controller for causing one definite temperature level to be maintained and movable to another definitely-located position in which the spring does not exert the same definite spring action on said flow controller as it did in said first definitely located position for causing the other temperature level to be maintained, means for causing said spring to be moved from one definitely-located position to the other to change the temperature from one definite predetermined level to another definite predetermined level, and transmission between said heat-expansible chamber and said flow controller whereby said chamber may cause force to be exerted on said flow controller, said thermostat construction comprising yielding lost motion means acting between the heat-expansible chamber and spring when the spring is in said first position and the heat-expansible chamber is causing force to be exerted on said flow controller.

16. In a temperature control system, a two-level temperature thermostat construction comprising a heat-expansible chamber, a temperature-controlled flow controller in said chamber controlled by the expansion and contraction of said chamber, and means for changing the temperature level control from one definite level to another definite level comprising a spring movable to one definitely-located position in which it exerts a definite spring action on said flow controller for causing one definite temperature level to be maintained and movable to another definitely-located position in which the spring does not exert the same definite spring action on said flow controller as it did in said first definitely located position for causing the other temperature level to be maintained, means for causing said spring to be moved from one definitely-located position to the other to change the temperature from one definite predetermined level to another definite predetermined level, said heat-expansible chamber comprising a heat extensible tube and said spring being mounted in said tube, and transmission between said heat-expansible chamber and said flow controller whereby said chamber may cause force to be exerted on said flow controller, said thermostat construction comprising yielding lost motion means acting between the heat-expansible chamber and spring when the spring is in said first position and the heat-expansible chamber is causing force to be exerted on said flow controller.

17. In a temperature control system, a two-level temperature thermostat construction comprising a heat-expansible chamber, a temperature-controlled flow controller in said chamber controlled by the expansion and contraction of said chamber, and means for changing the temperature level control from one definite level to another definite level comprising a spring movable to one definitely-located position in which it exerts a definite spring action on said flow controller for causing one definite temperature level to be maintained and movable to another definitely-located position in which the spring does not exert the same definite spring action on said flow controller as it did in said first definitely located position for causing the other temperature level to be maintained, means for causing said spring to be moved from one definitely-located position to the other to change the temperature from one definite predetermined level to another definite predetermined level, said heat-expansible chamber comprising a heat-extensible tube, and a plug closing the end of said tube, the spring being in said tube and mounted on said plug, and transmission between said heat-expansible chamber and said flow controller whereby said chamber may cause force to be exerted on said flow controller, said thermostat construction comprising yielding lost motion means acting between the heat-expansible chamber and spring when the spring is in said first position and the heat-expansible chamber is causing force to be exerted on said flow controller.

18. In a temperature control system, a two-level temperature thermostat construction comprising a heat-expansible chamber, a temperature-controlled flow controller in said chamber controlled by the expansion and contraction of said chamber, and means for changing the temperature level control from one definite level to another definite level comprising a spring movable to one definitely-located position in which it exerts a definite spring action on said flow controller for causing one definite temperature level to be maintained and movable to another definitely-located position in which the spring does not exert the same definite spring action on said flow controller as it did in said first definitely located position for causing the other temperature level to be maintained, means for causing said spring to be moved from one definitely-located position to the other to change the temperature from one definite predetermined level to another definite predetermined level, and adjustable stop means for selectively changing one of the said definitely limited positions.

19. In a temperature control system, a two-level temperature thermostat construction comprising a heat-expansible chamber, a temperature-controlled flow controller in said chamber controlled by the expansion and contraction of said chamber, and means for changing the temperature level control from one definite level to another definite level comprising a spring movable to one definitely-located position for causing one definite temperature level to be maintained and movable to another definitely-located position for causing the other temperature level to be maintained, means for causing said spring to be moved from one definitely-located position to the other to change the temperature from one definite predetermined level to another definite predetermined level, and remote control means for shifting said spring from one of said definitely-located positions to the other definitely-located position.

JOHN M. LARSON.